United States Patent [19]

Uemura et al.

[11] 4,091,134
[45] May 23, 1978

[54] COATED METAL PIPE

[76] Inventors: Masaru Uemura, Tokyo; Hitoshi Kuroki; Nobuhiro Echida, both of Yokohama; Yujiro Kosaka, Yokosuka, all of Japan

[21] Appl. No.: 717,406

[22] Filed: Aug. 24, 1976

[30] Foreign Application Priority Data

Sep. 1, 1975 Japan .................. 50-105785

[51] Int. Cl.$^2$ .............. F16L 58/10; F16L 58/12; B32B 15/04; B32B 15/08
[52] U.S. Cl. ..................... 428/36; 138/145; 260/28.5 AS; 428/461; 428/462; 428/467; 428/468; 428/489; 428/519
[58] Field of Search ........ 428/36, 462, 467, 468, 428/489, 461, 519; 260/28.5 AS; 138/145

[56] References Cited

U.S. PATENT DOCUMENTS

| | | | |
|---|---|---|---|
| 2,963,045 | 12/1960 | Canevari | 428/462 |
| 3,321,357 | 5/1967 | Kennedy | 428/489 |
| 3,395,110 | 7/1968 | Crady, Jr. | 260/28.5 AS |
| 3,442,841 | 5/1969 | Adelman | 260/28.5 AS |
| 3,459,695 | 8/1969 | Hedge | 428/468 |
| 3,574,652 | 4/1971 | Alexander | 428/36 |
| 3,869,417 | 3/1975 | Ramsay | 260/28.5 AS |
| 3,967,020 | 6/1976 | Uemura | 428/36 |

Primary Examiner—Ellis Robinson

[57] ABSTRACT

A coated metal pipe which comprises a pipe coated with a composition comprising
2 to 40 wt. parts of low molecular weight oxidized polymer of polypropylene or propylene-ethylene copolymer;
5 to 40 wt. parts of a rubber component selected from a group consisting of styrene-butadiene copolymer, polyisoprene, butyl rubber, chlorosulfonic polyethylene and polyisobutylene;
5 to 50 wt. parts of a tackifier and 10 to 80 wt. parts of asphalt.

13 Claims, 4 Drawing Figures

COATED METAL PIPE

BACKGROUND OF THE INVENTION

1. Field of the Invention

The present invention relates to a metal pipe coated with a layer which is characterized by excellent high thermal stability adhesiveness and recoatability.

2. Description of the Prior Art

Heretofore, it has been proposed to coat a metal pipe to be laid underground with an asphalt composition in order to make it anticorrosive. However, conventional asphalt compositions possess disadvantages in that they can easily be peeled from the surface of the metal pipe or they are subject to deterioration which decreases their anticorrosiveness.

Serious damage is caused by corrosion of metal pipe containing electrical cable such as telephone cable or metal pipe used for feeding gas.

Accordingly, excellent anticorrosiveness, safety and durability is desired for these metal pipe.

It has been proposed to coat the metal pipe with a composition comprising asphalt, ethylene-vinylacetate copolymer, styrene-butadiene rubber and rosin or petroleum resin in order to improve the coating properties.

However, in this case, the anticorrosiveness, stability and durability of the coated composition also deteriorate with age.

Additionally, it has been proposed to use various other coating compositions besides the asphalt composition. However, after the pipe is laid underground, cracks often form in these coated layers as a result of vibration, thereby permitting serious corrosion in the underlying pipe. Accordingly, it would be desirable to have a coated metal pipe which has excellent capability for being recoated. When a coated metal pipe is laid underground, it is exposed to changing temperatures. Accordingly, the coated layer should be effective independent of the change in temperature.

A need exists therefore for a coated metal pipe having the aforementioned desirable characteristics.

SUMMARY OF THE INVENTION

Accordingly, it is one object of the present invention to provide a coated metal pipe for laying underground which is coated with a layer having excellent thermal stability, adhesiveness and recoatability.

This and other objects of this invention as will hereinafter be made clear by the discussion below have been attained by providing a coated metal pipe for laying underground wherein the coating can be applied by a heat-melt process, wherein the coating comprises a composition of 2 to 40 wt. parts of low molecular weight oxidized polymer of polypropylene or propylene-ethylene copolymer; 5 to 40 wt. parts of a rubber component selected from a group consisting of styrene-butadiene copolymer, polyisoprene, butyl rubber, chlorosulfonic polyethylene, and polyisobutylene; 5 to 50 wt. parts of a tackifier and 10 to 80 wt. parts of asphalt.

DETAILED DESCRIPTION OF THE PREFERRED EMBODIMENTS

Figure 1:
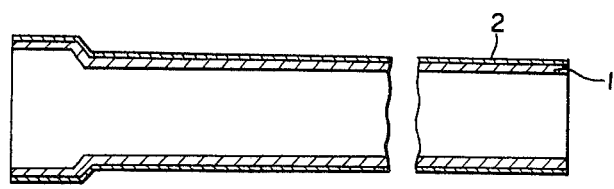
FIG. 1 is a plan sectional view of one embodiment of coated metal pipe according to the invention.

Referring to the drawings, 1 represents the body of the coated metal pipe for laying underground. It can be a steel pipe, a cast iron pipe, a welded pipe, or the like.

One end of the metal pipe 1 can be connected to other pipes by means of a flange or a screw thread. The diameter and the thickness of the metal pipe can be selected depending upon the particular application.

Typical metal pipes for laying underground include the following: gas feed pipes; metal pipes containing a cable, e.g., telephone line, telegraph line, electric feed wire, etc.; petroleum transportation pipes, water supply pipes; and other metal pipes. These metal pipes are usually made of steel or iron. Such pipes can be laid in cement, concrete or underground and, if necessary, can have a suitable protective coating.

The oxidized polymer coating composition 2 is coated on the surface of the metal pipe 1. The thickness of the composition 2 is usually 0.1 – 10 mm, preferably 0.2 – 1 mm. It is applied by heat-melting at 100° – 250° C with subsequent coating onto the metal pipe.

One of the main components of the oxidized polymer coating composition 2 is asphalt, such as straight asphalt, blown asphalt, cutback asphalt, bitumen, coal tar or a mixture thereof.

The asphalt comprises 10 – 80 wt. %, preferably 20 – 50 wt. % of the total composition. If the content of the asphalt is less than 10 wt. %, the initial adhesive force of the composition will be inferior. On the other hand, when the content of the asphalt is higher than 80 wt. %, the cohesive force and thermal stability of the composition will be inferior. The other main component of the composition is a low molecular weight oxidized polymer of propylene-ethylene copolymer, or polypropylene. It is preferred that the propylene-ethylene copolymer contain an ethylene component of 3 – 15 wt. %, and have an average molecular weight of 1000 – 5000, as measured by the vapor osmotic pressure method. Its acid value should be 1 – 20, preferably 2 – 7 as measured by the dioxane-tetralin solvent method (acid-alkali titration).

The low molecular weight oxidized polymer should constitute 2 – 40 wt. % of the total composition. When its content is less than 2 wt. %, the softening point of the composition is too low. On the other hand, when it is present at higher than 40 wt. %, the miscibility is inferior.

The low molecular weight oxidized polymer can be prepared by oxidizing propylene-ethylene copolymer, or polypropylene having an average molecular weight of 1,000 to 5,000 as measured by the vapor osmotic pressure method.

The methods of oxidation include use of an oxidizing agent such as potassium permanganate, or an oxidizing gas such as oxygen, air, oxygen-containing gas, ozone, etc.. Oxidation by an oxidizing gas is economical.

When the oxidation of a low molecular weight propylene-ethylene copolymer is carried out by using oxygen, an oxygen containing gas, or ozone, etc., a colorless low molecular weight oxidized propylene-ethylene copolymer can be obtained by combining steam with the gas at 50 – 300° C. A low molecular weight propylene-ethylene copolymer can also be prepared by telomerizing an olefin or by thermal cracking of polypropylene-ethylene copolymer.

The thermal cracking method is economical, and can be performed by thermal cracking high molecular weight propylene-ethylene copolymer at higher than 300° C in an inert gas, e.g., nitrogen, carbon dioxide, argon, etc. or in saturated or supersaturated steam.

The low molecular weight oxidized polypropylene can be produced by degrading polypropylene having relatively low molecular weight to form low molecular weight polypropylene and then oxidizing it to form the low molecular weight oxidized polypropylene having an acid value of 1 to 20.

The other principle component of the composition used in the invention is a tackifier. Suitable tackifiers include natural rosin, rosin polymers, rosin polyol esters, hydrogenated rosin and petroleum resins or mixture thereof. The petroleum resins include aromatic petroleum resins, aliphatic petroleum resins, alicyclic petroleum resins, etc. (MW 200 – 15,000, preferably 400 – 8000 as measured by liquid chromatography). They can be combined with the rosin. The terpene resins include α-pinene, β-pinene or a mixture thereof or a mixture of β-pinene and dipentene (softening point (Ball and Ring method) 5° – 230° C; MW 200 – 20,000, preferably 500 – 10,000).

From the viewpoint of thermal stability, it is desirable to use the aromatic petroleum resin and the rosins having a softening point of higher than 70° C in order to keep high temperature creep to a minimum. The tackifier should be present at 5 – 50 wt. %, preferably 10 – 40 wt. % of the total composition. When the tackifier is present at less than 5 wt. %, the adhesiveness and thermal resistance of the composition are inferior. On the other hand, when the tackifier content is more than 50 wt. %, the adhesiveness of the composition is inferior and it becomes brittle.

The other main component of the composition used in the invention is a styrene-butadiene copolymer, styrene-isoprene copolymer, polyisoprene, butyl rubber, chlorosulfonic polyethylene, polyisobutylene or a mixture thereof.

The styrene butadiene copolymer is preferably prepared by solution polymerization. It is preferable to use a block copolymer having a ratio of styrene to butadiene of 5 to 70; 95 to 30.

The polyisobutylene, butyl rubber, polyisoprene and chlorosulfonic polyethylene the rubber component preferably, have a mooney viscosity of 20 to 60.

The rubber component is present at 5 to 40 wt. % of the total composition. When the rubber component is present at less than 5 wt. %, the recoatability of the composition is inferior.

On the other hand, when the rubber component is present more than 40 wt. %, the fabricatability and fluidity are inferior.

A part of the asphalt can be substituted with amorphous polypropylene. A small amount of the asphalt can be substituted with an ethylene-vinylacetate copolymer, polyamide, polyolefin or polyester.

The recoatability of the composition is highly affected by the synergistic effect of the low molecular weight oxidized polymer of polypropylene or propylene-ethylene copolymer.

In the preparation of the coated metal pipe, the above-mentioned components are mixed, melted and coated on the surface of the metal surface.

The five components can be mixed simultaneously for melting. However, it is preferable to heat-melt separately the high melt viscosity components, by use of a kneader, such as a roll mill. The other components such as the asphalt, the tackifier and the low molecular weight oxidized polymer are also melted and blended. The former mixture is then blended with the latter mixture in the molten state to form the coating composition. It is possible to modify the order of the mixing of the components. The temperature for melt-blending can be relatively low when the blending is carried out by a mechanical force mixing method with high shear strength. It is preferred to heat the blend to a temperature slightly higher than that at which all components are melted, such as 100° – 250° C, preferably 130° – 170° C.

The coating of the metal pipe can be accomplished by various mechanical methods. The preferred technique is to coat the composition by heat-melt coating without a solvent.

A typical heat-melt coating method is the extrusion coater method in which the composition is charged into an extruder and is coated onto the surface of the metal pipe by moving the metal pipe in a die mounted at the end of the extruder.

With that method, the composition can be coated at the same time that it is prepared. Alternatively, it is possible to prepare blocks or pellets of the composition by heat-melt blending and then feed the blocks or pellets to the coater.

The process of coating the metal pipe usually involves the following steps; dust removal (steel or iron pipe surface treatment); preheating; pipe insertion (to coater); coating; and cooling. The coating of the composition is carried out at 100° – 250° C. The thickness of the coated layer is usually 0.1 – 10 mm preferably 0.1 – 1 mm, especially 0.2 – 0.5 mm.

Figure 2:
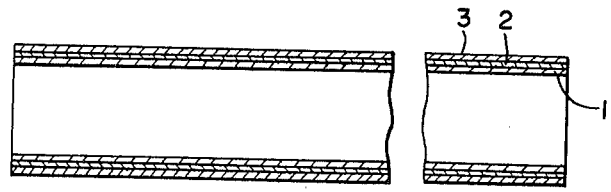
FIG. 2 is a plan sectional view of another embodiment of coated metal pipe.
Figure 3:
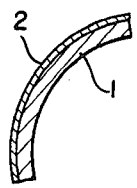
FIG. 3 is a side sectional view of the coated metal pipe of FIG. 1.
Figure 4:
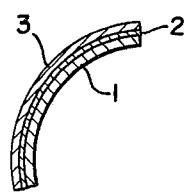
FIG. 4 is a side sectional view of the coated metal pipe of FIG. 2.

In order to impart electrical insulation, chemical resistance, water resistance, cold temperature resistance and recoatability to the coated metal pipe, it is possible to place an outer coating of a thermoplastic resin such as polyethylene, polypropylene, vinylchloride resin, etc. on the surface of the coated layer. It is especially preferable to coat high density or middle density polyethylene having a density of 0.94 – 0.98 g/cm$^3$ as the outer coating. Polyethylene having a density of 0.91 – 0.94 g/cm$^3$ can be used for coated metal pipes having small diameters. The outer coating of the thermoplastic resin can be applied by an extrusion method, a powdering method, or a tape binding method, etc.. The extrusion method can be used to apply the thermoplastic resin coating to small diameter metal pipes. As shown in FIG. 2 and FIG. 4, the thermoplastic resin upper coating 3 is formed over the oxidized polypropylene copolymer coating composition 2.

The thickness of the upper coat is usually 0.1 – 10 mm, preferably 0.1 – 2 mm, especially 0.3 – 10 mm.

The coated metal pipe of the present invention will be illustrated below with reference to the following Examples which are provided herein for purposes of illustration only.

EXAMPLES

The melt-viscosity, the R & B softening point, the adhesiveness, the recoatability recovering property, the fluidity and the thermal stability of the example coating compositions shown in the following tables were measured by the following test methods.

Test Methods (1) Melt viscosity — B type viscometer (150° C) [C.P.S.]
(2) R & B softening point — JIS K 2531 [° C]
(3) Adhesiveness — A coating composition which was heat-melted at 150° C was spread onto an iron plate preheated to 150° C. A spacer having a thickness of 0.2 mm was placed over that and a sheet made of polyethylene was used to cover the coated composition. The test assembly was cooled under a pressure of 10 kg/cm² and was left undisturbed for 24 hours. The peel strength was measured from 20° - 180° C with a peeling speed of 50 mm/min. [kg/10 mm]

(4) Recoatability — A coating composition was heat-melted and was spread onto an aluminum plate having a thickness of 0.5 mm. A polyethylene sheet having a thickness of 0.8 mm was placed over the coated composition under finger pressure to form a coated composition having a thickness of 0.3 mm. A hole having a diameter of 3 mm was formed on the polyethylene sheet. The coated composition in the hole was taken out with tweezers. The sample was kept in an oven at 35° C with the polyethylene sheet on top and a weight of 2 kg on it. After 24 hours, the condition of the hole was observed [%].

(5) Fluidity Test — A coating composition sheet of 6 cm × 4 cm × 0.5 cm was placed on a slant plate at an angle of 70° C in an oven at 90° C. After 3 hours, the distance over which the composition had flowed was measured. [mm]

(6) Thermal Stability — A coating composition was kept at 150° C for 96 hours. The change in melt-viscosity and the amount of the film formation were observed.

In Table 1 and Table 2, the following terms are used.

Asphalt: straight asphalt
SBR: styrene-butadiene copolymer (25 : 75) prepared by the solution polymerization method.
Rosin: purified rosin glycerine ester
Oxidized PP: oxidized ethylene-propylene copolymer having an average molecular weight of 3,000 (Acid value 5)
Low MW PP: polypropylene having an average molecular weight of 2,500
Polyisoprene: molecular weight of 2,750,000
Butyl rubber: mooney viscosity of 41 to 49
Chlorosulfonic polyethylene: mooney viscosity of 34
Polyisobutylene: molecular weight of 990,000

Table 1

| Composition | Example 1 wt. % | Example 2 wt. % | Example 3 wt. % | Example 4 wt. % | Example 5 wt. % | Example 6 wt. % | Example 7 wt. % |
| --- | --- | --- | --- | --- | --- | --- | --- |
| Asphalt | 42 | 40 | 44 | 50 | 40 | 40 | 45 |
| SBR | 10 | 18 | 21 | | | | |
| Polyisoprene | | | | 15 | | | |
| Butyl rubber | | | | | 25 | | |
| Chlorosulfonic polyethylene | | | | | | 20 | |
| Polyisobutylene | | | | | | | 18 |
| Rosin | 23 | 20 | 20 | 20 | 20 | 20 | 20 |
| PP Oxide | 7 | 4 | 10 | 5 | 15 | 10 | 19 |

Table 2

| Measured properties | Example 1 | Example 2 | Example 3 | Example 4 | Example 5 | Example 6 | Example 7 |
| --- | --- | --- | --- | --- | --- | --- | --- |
| Melt viscosity [C.P.S.] | 19,000 | 35,000 | 3,600 | 17,000 | 39,000 | 31,000 | 14,000 |
| R & B softening point [° C] | 95 | 106 | 110 | 140 | 120 | 115 | 108 |
| Adhesiveness [kg/10 mm] | 8 | 9 | 7 | 7 | 8 | 10 | 8 |
| Recoatability [%] | 100 | 100 | 100 | 100 | 100 | 100 | 100 |
| Fluidity [mm] | 3 | 1 | 1 | 1 | 2 | 1 | 1 |

The above results correlated well with the test results observed when the composition was coated on a steel pipe.

The coated metal pipe of the invention has a coated layer possessing excellent recoatability, adhesiveness, heat resistance and cold resistance. When the coating is cracked, the coated layer around the crack flows naturally to recover the crack. The anticorrosiveness is also excellent, as is the safety of the coated metal pipe when placed underground.

Additionally, the coated layer retains stability independent of temperature changes likely to occur during underground usage. This is a great advantage in the case of gas pipes for example, since it makes gas leakage unlikely.

Having now fully described the invention, it will be apparent to one of ordinary skill in the art that many changes and modifications can be made thereto without departing from the sprit or scope of the invention as set forth herein.

What is claimed as new and intended to be covered by Letters Patent is:

1. A coated metal pipe which comprises a pipe coated with a composition consisting of:
   2 to 40 wt. parts of a low molecular weight oxidized polymer of polypropylene or propylene-ethylene copolymer having an acid value of 1-20 as measured by the dioxane-tetralin solvent method;
   5 to 40 wt. parts of a rubber component selected from the group consisting of styrene-butadiene copolymer, polyisoprene, butyl rubber, chlorosulfonic polyethylene and polyisobutylene;
   5 to 50 wt. parts of a tackifier; and
   10 to 80 wt. parts of asphalt to a thickness of 0.1-10 mm.

2. The coated metal pipe of claim 1, wherein said low molecular weight oxidized polymer is a low molecular weight oxidized propyleneethylene copolymer.

3. The coated metal pipe of claim 1, wherein said low molecular weight oxidized polymer is a low molecular weight oxidized polypropylene.

4. The coated metal pipe of claim 1, wherein said low molecular weight oxidized polymer has a molecular weight of 1000–5000.

5. The coated metal pipe of claim 1, wherein the tackifier is rosin, rosin polymer, rosin polyol ester, hydrogenated rosin, hydrogenated rosin polyol ester, petroleum resin or terpene resin.

6. The coated metal pipe of claim 1, wherein the rubber component has mooney viscosity of 20 to 60.

7. The coated metal pipe of claim 1, wherein the composition is coated onto the surface of a pipe, the coating having a thickness of 0.1 – 5 mm.

8. The coated metal pipe of claim 1, wherein the composition is heat-melt coated onto the metal pipe body at 100° – 250° C to form a coated layer having a thickness of 0.1 – 10 mm.

9. The coated metal pipe of claim 1, wherein the metal pipe coated with the composition is overcoated with a thermoplastic resin having a thickness of 0.1 – 10 mm.

10. A coating composition, which consists of:
    2 to 40 weight parts of a low molecular weight oxidized polymer of propylene or a propylene-ethylene copolymer having an acid value of 1–20 as measured by the dioxanetetralin solvent method;
    5 to 40 weight parts of a rubber component selected from the group consisting of styrenebutadiene copolymer, polyisoprene, butyl rubber, chlorosulfonic polyethylene and polyisobutylene;
    5 to 50 weight parts of a tackifier; and
    10 to 80 weight parts of asphalt.

11. The composition of claim 10, wherein the low molecular weight oxidized polymer has a molecular weight of from 1000 to 5000.

12. The composition of claim 10, wherein the rubber component has a Moody viscosity of from 20 to 60.

13. The composition of claim 10, wherein the low molecular weight oxidized polymer is an ethylene-propylene copolymer containing from 3 to 15 weight percent ethylene.

* * * * *

UNITED STATES PATENT AND TRADEMARK OFFICE
CERTIFICATE OF CORRECTION

PATENT NO. : 4,091,134
DATED : May 23, 1978
INVENTOR(S) : Masaru Uemura et al

It is certified that error appears in the above-identified patent and that said Letters Patent are hereby corrected as shown below:

Please insert the following:

-- [73] Assignee: Toyo Soda Manufacturing Co., Ltd. Japan--

-- Attorney, Agent, or Firm- Oblon, Fisher, Spivak, McClelland & Maier--

Signed and Sealed this

Twelfth Day of December 1978

[SEAL]

Attest:

RUTH C. MASON
Attesting Officer

DONALD W. BANNER
Commissioner of Patents and Trademarks